(12) United States Patent
Na et al.

(10) Patent No.: US 9,185,286 B2
(45) Date of Patent: Nov. 10, 2015

(54) COMBINING EFFECTIVE IMAGES IN ELECTRONIC DEVICE HAVING A PLURALITY OF CAMERAS

(71) Applicant: Samsung Electronics Co., Ltd., Gyeonggi-do (KR)

(72) Inventors: Jin-Hee Na, Seoul (KR); Ki-Huk Lee, Gyeonggi-do (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 16 days.

(21) Appl. No.: 14/053,905

(22) Filed: Oct. 15, 2013

(65) Prior Publication Data
US 2014/0232904 A1  Aug. 21, 2014

(30) Foreign Application Priority Data
Feb. 21, 2013  (KR) ........................ 10-2013-0018761

(51) Int. Cl.
*H04N 5/225*  (2006.01)
*H04N 5/232*  (2006.01)
*H04N 5/235*  (2006.01)
*H04N 5/243*  (2006.01)
*H04N 1/387*  (2006.01)
*H04N 1/407*  (2006.01)
*H04N 1/60*   (2006.01)

(52) U.S. Cl.
CPC ........... *H04N 5/23229* (2013.01); *H04N 1/387* (2013.01); *H04N 1/4072* (2013.01); *H04N 1/6027* (2013.01); *H04N 5/2258* (2013.01); *H04N 5/2353* (2013.01); *H04N 5/2355* (2013.01); *H04N 5/23245* (2013.01); *H04N 5/243* (2013.01)

(58) Field of Classification Search
USPC ..................................... 348/207.99
See application file for complete search history.

(56) References Cited

U.S. PATENT DOCUMENTS

2009/0207279 A1*  8/2009  Ochi et al. ............... 348/231.99
2012/0120186 A1*  5/2012  Diaz et al. ....................... 348/36
2012/0162356 A1*  6/2012  Van Bree et al. .......... 348/14.16
2013/0235224 A1*  9/2013  Park et al. .................. 348/218.1

* cited by examiner

*Primary Examiner* — Anthony J Daniels
(74) *Attorney, Agent, or Firm* — Cha & Reiter, LLC

(57) ABSTRACT

An image combining method in an electronic device having a plurality of cameras. In response to a photographing signal, images successively photographed through at least a first camera are successively stored. A first image is selected from the successively photographed images which satisfies a predetermined classification reference, such as a degree of blurring, a facial expression, and/or a shooting composition. A second image is captured through a second camera; and the first and second images are then combined. The combined image may be a picture-in-picture (PIP) type combination image. The first and second cameras may be front and rear cameras of a portable terminal, or vice versa. The successive image capture and selection technique may also be applied to the second camera.

9 Claims, 12 Drawing Sheets

COMBINING EFFECTIVE IMAGES IN ELECTRONIC DEVICE HAVING A PLURALITY OF CAMERAS

CLAIM OF PRIORITY

This application claims the priority under 35 U.S.C. §119(a) to Korean Application Serial No. 10-2013-0018761, which was filed in the Korean Intellectual Property Office on Feb. 21, 2013, the entire content of which is hereby incorporated by reference.

BACKGROUND

1. Technical Field

The present disclosure relates generally an electronic device having a plurality of cameras and more particularly, to a method for combining effective images among images photographed by using a plurality of such cameras.

2. Description of the Related Art

Currently, with the rapid development of communication technologies, functions of portable electronic devices such as portable terminals have been expanded, and accordingly, more diverse User Interfaces (UIs) and various functions using the UIs have been provided. In order to increase an effective value of portable terminals and meet various user demands, a variety of portable terminal applications have been developed.

Application functions using a camera have expanded greatly. For example, a camera phone function as well as a video phone function with video conferencing are typical applications in today's smart phones. Another example is an image combining application which is downloadable through a wireless Internet service, in which various image combining applications are possible, e.g., combining a user's hair style in a picture photographed by the user.

Further, in order to satisfy various tastes of users, a dual camera portable terminal with front and rear cameras is currently available. A dual camera portable terminal can display a main image photographed through one camera on a preview screen, while a sub image photographed through the other camera is overlaid with the main image in a form of Picture In Picture (PIP). In the portable terminal having the dual camera, a rear camera of the portable terminal is fixed to face a rear direction of the portable terminal, and a front camera of the portable terminal is fixed to face a front direction so as to photograph the user.

However, while it's possible to simultaneously identify two images through the two cameras facing in opposite directions, several limitations with current technology are apparent. First, in the sub image displayed smaller than the main image in the PIP form, the user has a difficulty in identifying a quality of the sub image with the naked eye due to a size limitation of the sub image. In addition, when different images photographed through the actual dual camera are combined, a combined image may be unsatisfactory if hand trembling occurs.

Thus, the conventional art does not provide a method of guaranteeing quality of the combined image in a dual camera portable terminal.

SUMMARY

Embodiments of the present invention combine two images which satisfy a predetermined standard among images photographed simultaneously or with time differences therebetween by using a plurality of cameras in order to guarantee a quality of the combined image.

A method of combining effective images in an electronic device having a plurality of cameras is provided. In response to a photographing signal, images successively photographed through at least a first camera are successively stored. A first image is selected from the successively photographed images which satisfies a predetermined classification reference, such as a degree of blurring, a facial expression, and/or a shooting composition. A second image is captured through a second camera; and the first and second images are combined.

In various embodiments, the combined image may be a picture-in-picture (PIP) type combination image. The first and second cameras may be front and rear cameras of a portable terminal, or vice versa. The successive image capture and selection technique may also be applied to the second camera.

In an embodiment, an electronic device having a plurality of cameras for combining effective images is provided. The electronic device includes a first camera which successively photographs images in response to a photographing signal. A second camera photographs a second image; and a controller selects a first image satisfying a predetermined classification reference from the images successively photographed through the first camera and combines the first and second images.

In another embodiment, a method of combining effective images in an electronic device having front and rear cameras is provided. In response to a photographing signal, front and rear images are captured from the front and rear cameras, respectively. A difference is determined in at least one of brightness and tone between the front and rear images. At least one of the front and rear images is modified to equalize brightness or tone between the front and rear images if the difference exceeds a predetermined threshold. The front and rear images are then combined.

BRIEF DESCRIPTION OF THE DRAWINGS

The above and other aspects, features, and advantages of the present invention will be more apparent from the following detailed description taken in conjunction with the accompanying drawings, in which.

DETAILED DESCRIPTION

Figure 1:
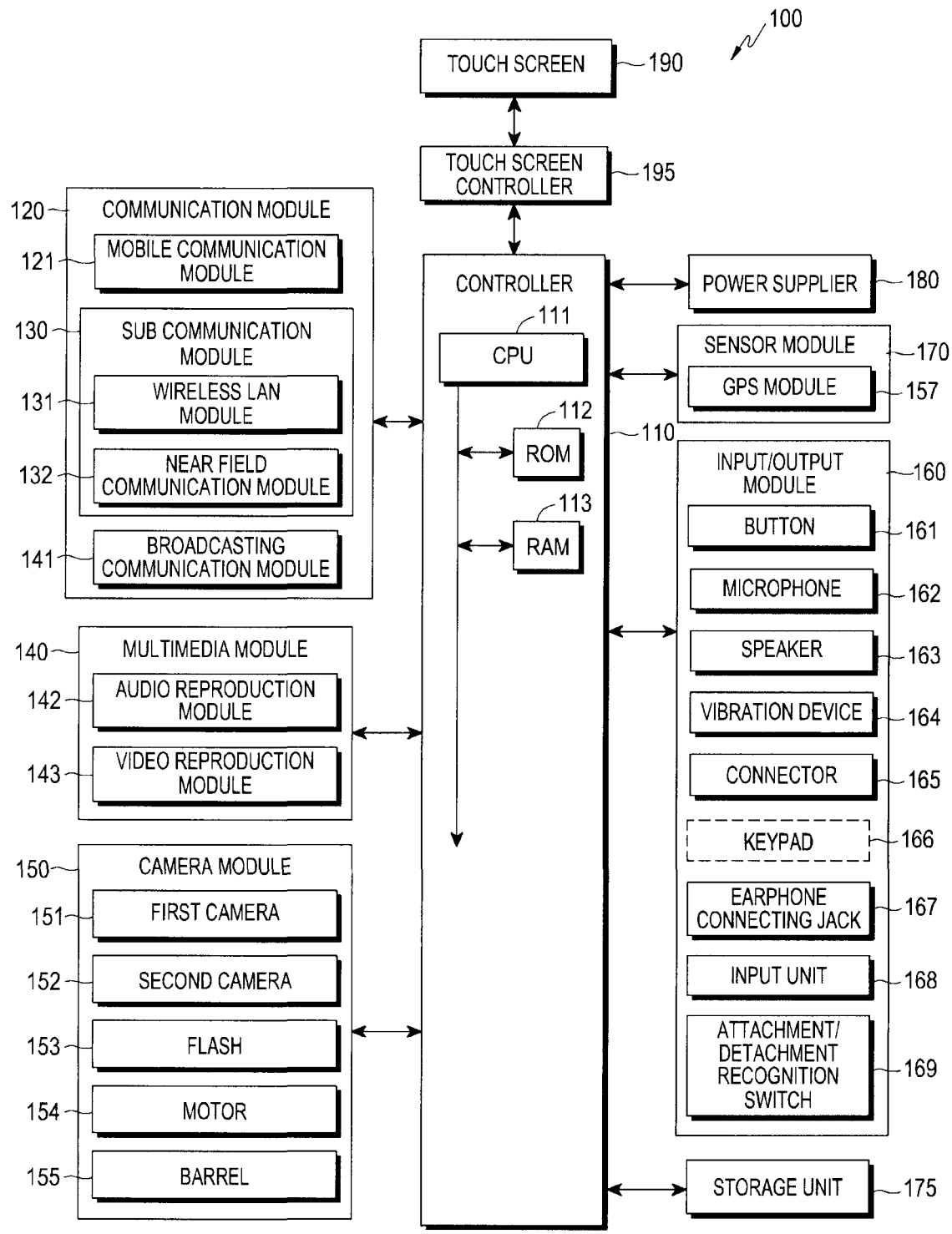
FIG. 1 is a block diagram illustrating the inside of a portable terminal according to an embodiment of the present invention.

Hereinafter, various embodiments of the present invention will be described with reference to the accompanying drawings. However, the present invention is not limited or restricted by the embodiments of the present invention described herein. The same or like elements will be designated by the same or like reference numerals although they are shown in different drawings.

While terms including ordinal numbers, such as "first" and "second," etc., may be used to describe various components, such components are not limited by the above terms. The above terms are used only to distinguish one component from another. For example, a first component may be referred to as a second component without departing from the scope of the present invention, and likewise a second component may be referred to as a first component. The terms used herein are merely used to describe specific embodiments, and are not intended to limit the present invention. An expression used in the singular encompasses the expression of the plural, unless it has a clearly different meaning in the context.

Embodiments discussed below are described as examples of a portable (or hand-held) terminal, but an image combining method according to the present invention can be applied to various portable and fixed electronic devices such as a camera, a navigation device, a television (TV), an Automatic Teller Machine (ATM) of a bank, a Point of Sale (POS) device of a store and the like as well as terminals such as a mobile phone, a smart phone, a tablet PC and the like. Further, an electronic device according to the present invention can be a flexible device or a flexible display device. A representative configuration of the portable terminal described below corresponds to a configuration of the mobile phone. Some components of the representative configuration of the portable terminal may be omitted or changed as necessary.

The present disclosure provides an image combining method in an electronic device. The image combining method includes processes of selecting images one by one from a plurality of images successively photographed by a plurality of cameras through application of a predetermined classification reference, combining the selected images, and storing the combined images. The predetermined classification reference refers to a numerical value of a photography metric, examples of which include but are not limited to a blur amount within an image, a facial expression of a person, and a shooting composition. Accordingly, the combined image is generated by combining the images satisfying the predetermined classification reference, which causes an effect of improving a quality of the combined image.

FIG. 1 is a block diagram schematically illustrating a portable terminal, 100, according to an embodiment of the present invention. Portable terminal 100 can be connected with an external electronic device (not shown) by using at least one of a communication module 120, a connector 165, and an earphone connecting jack 167. Examples of the external electronic device include any of various devices attached to or detached from the portable terminal through a cable, such as an earphone, an external speaker, a Universal Serial Bus (USB) memory, a charger, a cradle/dock, a DMB antenna, a mobile payment related device, a health management device (blood sugar tester or the like), a game machine, a car navigation device and the like. Further, the external electronic device can be a Bluetooth communication device, a Near Field Communication (NFC) device, a WiFi Direct communication device, and a wireless Access Point (AP) which can be wirelessly connected. In addition, the portable terminal 100 can be connected with another portable terminal or portable electronic device, for example, a mobile phone, a smart phone, a tablet PC, a desktop PC, or a server wirelessly or through a wire.

Portable terminal 100 includes a touch screen 190, at least one touch screen controller 195, a controller 110, a communication module 120, a multimedia module 140, a camera module 150, an input/output module 160, a sensor module 170, a storage unit 175, and a power supplier 180.

The communication module 120 includes a mobile communication module 121, a sub communication module 130, and a broadcasting communication module 141.

The sub communication module 130 includes at least one of a wireless LAN module 131 and a near field communication module 132, and the multimedia module 140 includes at least one of an audio reproduction module 142 and a video reproduction module 143.

The camera module 150 includes a first camera 151 and a second camera 152, described further below. The input/output module 160 includes at least one of a button(s) 161, a microphone 162, a speaker 163, a vibration device 164, a connector 165, and a keypad 166.

The controller 110 includes a CPU 111, a ROM 112 storing a control program for controlling the portable terminal 100, and a RAM 113 used as a storage area for storing a signal or data input from the outside of the portable terminal 100 or for work performed in the portable 100. The CPU 111 can be a single core, a dual core, a triple core, or a quad core. The CPU 111, the ROM 112, and the RAM 113 can be mutually connected to each other through an internal bus.

Further, the controller 110 can control the communication module 120, the multimedia module 140, the camera module 150, the input/output module 160, the sensor module 170, the storage unit 175, the power supplier 180, the touch screen 190, and the touch screen controller 195.

The controller 110 detects a user input as an input unit 168 or a touch input means such as a user's finger touches or approaches one object or is located close to the object in a state where a plurality of objects or items are displayed on the touch screen 190, and identifies an object corresponding to a position of the touch screen 190 where the user input is generated. The user input through the touch screen 190 includes one of a direct touch input of directly touching the object and a hovering input which is an indirect touch input of approaching the object within a preset recognition range but not directly touching the object. For example, when the input unit 168 is located close to the touch screen 190, an object located directly below the input unit 168 may be selected. According to the present invention, user inputs include a gesture input through the camera module 150, a switch/button input through the button 161 or the keypad 166, a voice input through the microphone 162, and the like as well as the user input through the touch screen 190.

The object or item (or function item) is displayed on the touch screen 190 of the portable terminal 100. For example, the object or item indicates at least one of an application, a menu, a document, a widget, a picture, a video, an e-mail, an SMS message, and an MMS message, and can be selected, executed, deleted, canceled, stored, and changed by a user input means. "Item" as used herein can mean a button, an icon (or short-cut icon), a thumbnail image, and a folder storing at least one object in the portable terminal. Further, the item can be displayed in a form of an image, a text or the like.

The short-cut icon is an image displayed on the touch screen 190 of the portable terminal 100 to rapidly execute each application or operation of phone communication, a contact number, a menu and the like basically provided in the portable terminal 100. When a command or selection for executing the application or the operation is input, the short-cut icon executes the corresponding application.

Further, the controller 110 can detect a user input event such as a hovering event as the input unit 168 approaches the touch screen 190 or is located close to the touch screen 190.

When a user input event is generated according to a preset item or in a preset manner, the controller 110 performs a preset program action corresponding to the user input event.

The controller 110 can output a control signal to the input unit 168 or the vibration device 164. The control signal includes information on a vibration pattern and the input unit 168 or the vibration device 164 generates a vibration according to the vibration pattern. The information on the vibration pattern indicates the vibration pattern itself, an identifier of the vibration pattern or the like. Alternatively, the control signal simply includes only a request for generation of the vibration.

The portable terminal 100 includes at least one of the mobile communication module 121, the wireless LAN module 131, and the near field communication module 132.

The mobile communication module 121 enables the portable terminal 100 to be connected with the external device through mobile communication by using one antenna or a plurality of antennas according to a control of the controller 110. The mobile communication module 121 transmits/receives a wireless signal for voice phone communication, video phone communication, a Short Message Service (SMS), or a Multimedia Message Service (MMS) to/from a mobile phone (not shown), a smart phone (not shown), a tablet PC, or another device (not shown) having a phone number input into the portable terminal 100.

The sub communication module 130 may include at least one of the wireless LAN module 131 and the near field communication module 132. For example, the sub communication module 130 may include only the wireless LAN module 131, only the near field communication module 132, or both the wireless LAN module 131 and the near field communication module 132.

The wireless LAN module 131 can be Internet-connected according to a control of the controller 110 in a place where a wireless Access Point (AP) (not shown) is installed. The wireless LAN module 131 supports a wireless LAN standard (IEEE802.11x) of the Institute of Electrical and Electronics Engineers. The near field communication module 132 can wirelessly perform near field communication between the portable terminal 100 and the external device (not shown) according to a control of the controller 110. A near field communication scheme may include Bluetooth, Infrared Data Association (IrDA) communication and the like.

The controller 110 can transmit the control signal according to a haptic pattern to the input unit 168 through the sub communication module 130.

The broadcasting communication module 141 can receive a broadcasting signal (for example, a TV broadcasting signal, a radio broadcasting signal, or a data broadcasting signal) and broadcasting supplement information (for example, Electric Program Guide: EPG or Electric Service Guide: ESG) output from a broadcasting station through a broadcasting communication antenna (not shown) according to a control of the controller 110.

The multimedia module 140 includes the audio reproduction module 142 or the video reproduction module 143. The audio reproduction module 142 can reproduce a digital audio file (for example, a file having a file extension of mp3, wma, ogg, or way) stored or received according to a control of the controller 110. The video reproduction module 143 can reproduce a digital video file (for example, a file having a file extension of mpeg, mpg, mp4, avi, mov, or mkv) stored or received according to a control of the controller 110. The video reproduction module 143 can reproduce the digital audio file.

The multimedia module 140 may be integrated with the controller 110.

The camera module 150 includes the first and second cameras 151 and 152 for photographing a still image or a video according to a control of the controller 110. Further, the camera module 150 includes at least one of the barrel 155 for performing zoom-in/zoom-out for photographing a subject, the motor 154 for controlling a motion of the barrel 155, and the flash 153 for providing an auxiliary light source required for photographing the subject. The first camera 151 may be disposed on a front surface of the portable terminal 100 to typically capture a close-up image of the user. The second camera 152 may be disposed on a rear (back) surface of the portable terminal 100 so as to typically photograph a scene or subject as in a conventional camera. Other positions for the first and second cameras 151, 152 are also possible.

Each of the first and second cameras 151 and 152 includes a lens system, an image sensor and the like. Each of the first and second cameras 151 and 152 converts an optical signal input (or photographed) through the lens system to an electrical image signal and outputs the converted electrical image signal to the controller 110. Then, the user photographs a video or a still image through the first and second cameras 151 and 152 by touching a predetermined shutter icon on the display or pressing a physical shutter key/button if provided.

The input/output module 160 includes at least one of at least one button 161, at least one microphone 162, at least one speaker 163, at least one vibration device 164, the connector 165, the keypad 166, the earphone connecting jack 167, and the input unit 168. Further, the input/output module 160 is not limited thereto, and may be provided in order to enable a cursor control such as a mouse, a trackball, a joystick, or cursor direction keys to control a motion of a cursor on the touch screen 190.

The button 161 may be formed on a front surface, a side surface, or a back surface of a housing of the portable terminal 100, and may include at least one of a power/lock button, a volume button, a menu button, a home button, and a back button.

The microphone 162 receives a voice or a sound to generate an electrical signal according to a control of the controller 110.

The speaker 163 can output sounds corresponding to various signals or data (for example, a wireless signal, a broadcasting signal, a digital audio file, a digital video file, taking a picture or the like) to the outside of the portable terminal 100 according to a control of the controller 110. The speaker 163 can output a sound (for example, button tone corresponding to phone communication, ringing tone, and a voice of another user) corresponding to a function performed by the portable terminal 100. One speaker 163 or a plurality of speakers 163 may be formed on a suitable position or positions of the housing of the portable terminal 100.

The vibration device 164 can convert an electrical signal to a mechanical vibration according to a control of the controller 110. For example, when the portable terminal 100 in a vibration mode receives voice phone communication or video phone communication from another device (not shown), the vibration device 14 is operated. One vibration device 164 or a plurality of vibration devices 164 may be formed within the housing of the portable terminal 100. The vibration device 164 can operate in accordance with a user input through the touch screen 190.

The connector 165 may be used as an interface for connecting the portable terminal 100 with an external electronic device or a power source (not shown). The controller 110 can transmit data stored in the storage unit 175 of the portable terminal 100 to the external electronic device or receive the data from the external electronic device through a wired cable connected to the connector 165. The portable terminal 100 can receive power from the power source through the wired cable connected to the connector 165 or charge a battery (not shown) by using the power source.

The keypad 166 can receive a key input from the user for the control of the portable terminal 100. The keypad 166 includes a physical keypad (not shown) formed in the portable terminal 100 or a virtual keypad (not shown) displayed on the display unit 190. The physical keypad (not shown) formed in the portable terminal 100 may be excluded according to capability or a structure of the portable terminal 100.

An earphone (not shown) is inserted into the earphone connecting jack 167 to be connected with the portable terminal 100.

The input unit 168 may be inserted into the portable terminal 100 for storage when not in use, and may be withdrawn or separated from the portable terminal 100 when it is used. An attachment/detachment recognition switch 169 operating in accordance with attachment or detachment of the input unit 168 is located in one area within the portable terminal 100 into which the input unit 168 is inserted, and can output signals corresponding to the attachment and the detachment of the input unit 168 to the controller 110. The attachment/detachment recognition switch 169 may be directly or indirectly connected with the input unit 168 when the input unit 168 is mounted. Accordingly, the attachment/detachment recognition switch 169 generates a signal corresponding to the attachment or the detachment (that is, a signal notifying of the attachment or the detachment of the input unit 168) based on whether the attachment/detachment recognition switch 169 is connected with the input unit 168 and then outputs the generated signal to the controller 110.

The sensor module 170 includes at least one sensor for detecting a state of the portable terminal 100. For example, the sensor module 170 includes at least one of a proximity sensor for detecting whether the user approaches the portable terminal 100, a luminance sensor (not shown) for detecting an amount of ambient light of the portable terminal 100, or a motion sensor (not shown) for detecting motions of the portable terminal 100 (for example, a rotation of the portable terminal 100, and an acceleration or vibration of the portable terminal 100), a geo-magnetic sensor for detecting a point of the compass of the portable terminal by using the Earth's magnetic field, a gravity sensor for detecting a gravity action direction, an altimeter for measuring an atmospheric pressure to detect an altitude and a GPS module 157.

The GPS module 157 can receive radio waves from a plurality of GPS satellites (not shown) in Earth's orbit and calculate a position of the portable terminal 100 by using Time of Arrival from the GPS satellites to the portable terminal 100.

The storage unit 175 can store a signal or data input/output according to the operation of the communication module 120, the multimedia module 140, the camera module 150, the input/output module 160, the sensor module 170, or the touch screen 190. The storage unit 175 can store a control program and applications for controlling the portable terminal 100 or the controller 110.

The term "storage unit" refers to a random data storage device such as the storage unit 175, the ROM 112 and the RAM 113 within the controller 110, or a memory card (for example, an SD card or a memory stick) installed in the portable terminal 100. The storage unit 175 may include a nonvolatile memory, a volatile memory, a Hard Disk Drive (HDD), or a Solid State Drive (SSD).

Further, the storage unit 175 can store applications having various functions such as navigation, video phone communication, game, and alarm applications based on the time, images for providing a Graphical User Interface (GUI) related to the applications, databases or data related to a method of processing user information, a document, and a touch input, and background images (a menu screen, an idle screen or the like) required for driving the portable terminal 100, operating programs, and images photographed by the camera module 150.

In addition, the storage unit 175 can store data related to a combined image providing method in accordance with embodiments described herein.

The storage unit 175 is a machine (for example, computer)-readable medium. The term "machine readable medium" refers to a medium providing data to the machine such that the machine performs a specific function. The storage unit 175 can include a non-volatile medium and/or a volatile medium. Both of these media are tangible so that commands transmitted through the media can be detected by a physical mechanism reading the commands through the machine.

Examples of the machine readable medium include at least one of a floppy disk, a flexible disk, a hard disk, a magnetic tape, a Compact Disc Read-Only Memory (CD-ROM), an optical disk, a punch card, a paper tape, a RAM, a Programmable Read-Only Memory (PROM), an Erasable PROM (EPROM), and a flash-EPROM, but are not limited thereto.

The power supplier 180 can supply power to one battery or a plurality of batteries arranged at the housing of the portable terminal 100 according to a control of the controller 110. The one battery or the plurality of batteries supply power to the portable terminal 100. Further, the power supplier 180 can supply power input from an external power source to the portable terminal 100 through a wired cable connected to the connector 165. In addition, the power supplier 180 can supply power wirelessly input from the external power source to the portable terminal 100 through a wireless charging technology.

Further, the portable terminal 100 includes at least one touch screen 190 providing user graphic interfaces corresponding to various services (for example, phone communication, data transmission, broadcasting, and photography) to the user.

The touch screen 190 can output an analog signal corresponding to at least one user input received by the user graphic interface to the touch screen controller 195.

The touch screen 190 can receive at least one user input through a body of the user (for example, fingers including a thumb) or the input unit 168 (for example, a stylus pen or an electronic pen).

The touch screen 190 can receive successive motions of one touch (that is, a drag input). The touch screen 190 can output an analog signal corresponding to the successive motions of the input touch to the touch screen controller 195.

The touch used in the present invention is not limited to a contact between the touch screen 190 and the finger or input unit 168, and may include a noncontact interaction (for example, a case where the user input means is located within a recognition distance (for example, 1 cm) where the user input means can be detected without a direct contact). A distance or interval within which the user input means can be recognized in the touch screen 190 may be designed according to a capacity or structure of the portable terminal 100. Particularly, the touch screen 190 is configured to output different values (for example, including a voltage value or a current value as an analog value) detected by a direct touch event and a hovering event so that the direct touch event by a contact with the user input means and the direct touch event (that is, the hovering event) can be distinguishably detected.

The touch screen 190 can be implemented in, for example, a resistive type, a capacitive type, an infrared type, an acoustic wave type, or a combination thereof.

Further, the touch screen 190 includes two or more touch panels which can detect touches or approaches of the finger and the input unit 168 in order to receive inputs by the finger and the input unit 168, respectively. The two or more touch panels provide different output values to the touch screen controller 195. Then, the touch screen controller 195 can recognize the different values input to the two or more touch panels to distinguish whether the input from the touch screen 190 is an input by the finger or an input by the input unit 168.

The touch screen controller 195 converts an analog signal input from the touch screen 190 to a digital signal and transmits the converted digital signal to the controller 110. The controller 110 can control the touch screen 190 by using the digital signal received from the touch screen controller 195. For example, the controller 110 allows a short-cut icon (not shown) or an object displayed on the touch screen 190 to be executed in response to the direct touch event or the hovering event. Further, the touch screen controller 195 may be integrated with the controller 110.

The touch screen controller 195 can identify a hovering interval or distance as well as a user input position by detecting a value (for example, a current value or the like) output through the touch screen 190, and convert the identified distance value to a digital signal (for example, a Z coordinate) and then provide the converted digital signal to the controller 110. Further, the touch screen controller 195 in certain implementations can detect pressure with which the user input means presses the touch screen 190 by detecting a value (for example, a current value or the like) output through the touch screen 190, and converts the identified pressure value to a digital signal and then provide the converted digital signal to the controller 110.

Figure 2:
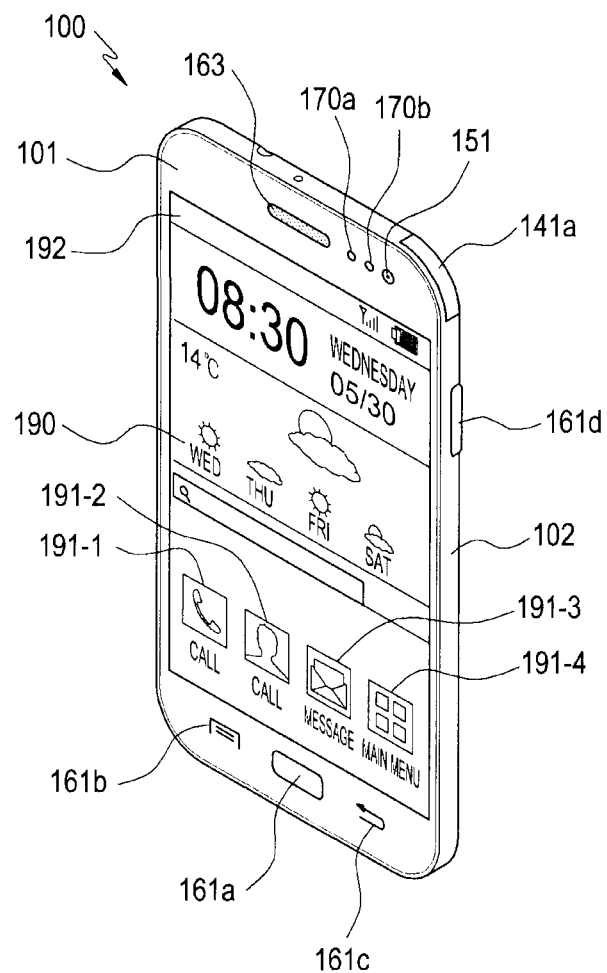
FIG. 2 is a front perspective view of a portable terminal according to an embodiment of the present invention.
Figure 3:
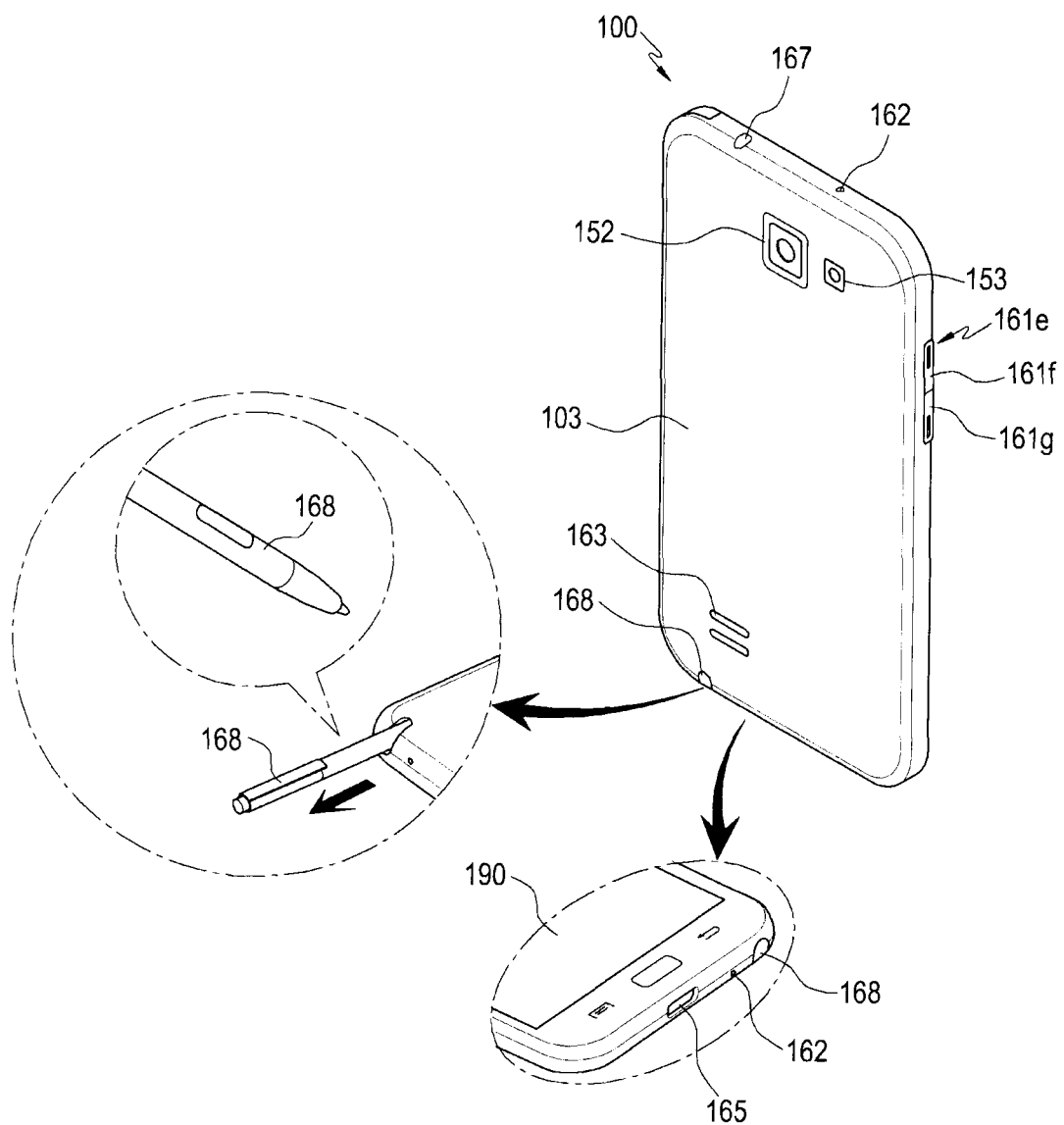
FIG. 3 is a rear perspective view of a portable terminal according to an embodiment of the present invention.

FIG. 2 illustrates an example front perspective view of the portable terminal 100, and FIG. 3 illustrates an example rear perspective view of the portable terminal. As shown in FIGS. 2 and 3, the touch screen 190 is centrally disposed on a front surface 101 of the portable terminal 100, and preferably occupies most of the front surface 101. FIG. 2 shows an example where a main home screen is displayed on the touch screen 190. The main home screen is a first screen displayed on the touch screen 190 when power of the portable terminal 100 is turned on. Further, when portable terminal 100 has different home screens of several pages, the main home screen may be a first home screen of the home screens of several pages. Short-cut icons 191-1, 191-2, and 191-3 for executing frequently used applications, a main menu switching key 191-4, time, weather and the like may be displayed on the home screen. When the user selects the main menu switching key 191-4, the menu screen is displayed on the touch screen 190. Further, a status bar 192 which displays the status of the portable terminal 100 such as a battery charging status, a received signal intensity, and a current time may be formed on an upper end of the touch screen 190.

A home button 161a, a menu button 161b, and a back button 161c may be formed on a lower end of the touch screen 190.

The home button 161a displays the main home screen on the touch screen 190. For example, when the home button 161a is selected in a state where a home screen different from the main home screen or the menu screen is displayed on the touch screen 190, the main home screen is displayed on the touch screen 190. Further, when the home button 161a is selected while applications are executed on the touch screen 190, the main home screen shown in FIG. 2 is displayed on the touch screen 190. In addition, the home button 161a may be used to display recently used applications or a task manager on the touch screen 190.

The menu button 161b provides a connection menu which can be displayed on the touch screen 190. The connection menu includes a widget addition menu, a background changing menu, a search menu, an editing menu, an environment setup menu and the like.

The back button 161c can be used for displaying the screen which was executed just before the currently executed screen or terminating the most recently used application.

The first camera 151, the luminance sensor 170a, and the proximity sensor 170b may be disposed on edges of the front surface 100a of the portable terminal 100. The second camera 152, the flash 153, and the speaker 163 may be disposed on a rear surface 103 of the portable terminal 100.

For example, a power/reset button 161d, volume buttons 161e having a volume increase button 161f and a volume decrease button 161g, a terrestrial DMB antenna 141a for broadcasting reception, and one or a plurality of microphones 162 may be disposed on a side surface 102 of the portable terminal 100. The DMB antenna 141a may be fixed to the portable terminal 100 or may be formed to be detachable from the portable terminal 100.

Further, the connector 165 is formed on a side surface of a lower end of the portable terminal 100. A plurality of electrodes are formed in the connector 165, and the connector 165 can be connected to the external device through a wire. The earphone jack 167 may be formed on a side surface of an upper end of the portable terminal 100. Earphones may be inserted into the earphone jack 167.

Further, the input unit 168 may be mounted to a side surface of a lower end of the portable terminal 100. The input unit 168 can be inserted into the portable terminal 100 to be stored in the portable terminal 100, and withdrawn and separated from the portable terminal 100 when it is used.

Meanwhile, although FIG. 1 illustrates the two cameras 151 and 152, two or more cameras can be mounted at different positions. Accordingly, the present invention can be similarly applied to the process of combining images photographed through a plurality of cameras at positions other than front and rear camera positions to make the images one combined image. That is, the one combined image can be generated by selecting one image from images photographed through the first camera 151, selecting one image from images photographed through the second camera 152, selecting one image from images photographed through a third camera (not shown), and combining the selected images. However, a case of using the first camera 151 and the second camera 152 will be described as an example for convenience of the description hereinafter.

An embodiment of the present invention provides an image generated by combining a rear view image photographed by the second camera 152 and a front view image photographed by the first camera 151. Hereafter, for convenience of description of this embodiment, the first and second cameras will be interchangeably called the front and rear cameras, respectively. The rear is a direction which projects from a rear surface of the portable terminal 100, and the front is the opposite direction which projects from a front surface of the portable terminal. Thus the front camera 151 can be constructed to photograph a user's face or body, and the rear camera 152 can be constructed to photograph a subject to be photographed or a foreground in a direction viewed from the user's eyes.

The controller 110 controls general operations of the portable terminal 100 and controls other components within the portable terminal 100 to perform a combined image providing method. Particularly, the controller 110 analyzes front view images and rear view images acquired by photographing the user and the subject by controlling a plurality of cameras mounted to the portable terminal 100, selects effective images from the front view images and the rear view images, and then performs a function of controlling an operation for combining the effective images selected from the front view images and rear view images. In the embodiment of the present invention, the operation of analyzing the images refers to an operation of analyzing whether there are effective front and rear view images which satisfy a classification reference through application of the classification reference to front and rear view images received through respective cameras.

Prior to describing further details of certain embodiments of the present invention, a "dual shot" and a "best shot" used in such embodiments will be briefly described.

A "dual shot" corresponds to a function of simultaneously or sequentially photographing two images by using cameras located in different positions and combining the two images into one image. A "best shot" corresponds to a function of successively photographing a plurality of images for the purpose of capturing a still image, and selecting one of the images as a best image according to a predetermined classification reference. Here, the predetermined classification reference is a numerical value of a photography metric such as a blur amount within the image, a facial expression of the person, a shooting composition, and the like.

When simultaneous or staggered photographing is performed through the front camera 151 and the rear camera 152 in a dual shot mode, quality degradation may occur in at least one of the front and rear view images. For example, when the user photographs the subject by using the rear camera 152, the user should adjust a direction of the rear camera 152 such that the subject enters an angle of view. At this time, image blurring by hand trembling and/or a shooting composition such as level maintenance (i.e., avoiding undesired tilting) should be also considered. At the same time, the user should pay attention to positioning his/her own face in a desired position as shown on the display and being photographed without blinking through the front camera 151. Thus, in the dual shot mode, since satisfaction of the actually photographed images may deteriorate due to various photographing conditions which are more complex than in conventional, single camera photography, quality degradation may occur when the photographed images are combined. Accordingly, embodiments of the present invention provide a method of guaranteeing quality of the combined image by combining only images which satisfy a predetermined classification reference through analysis of images photographed in the dual shot mode.

Figure 4:
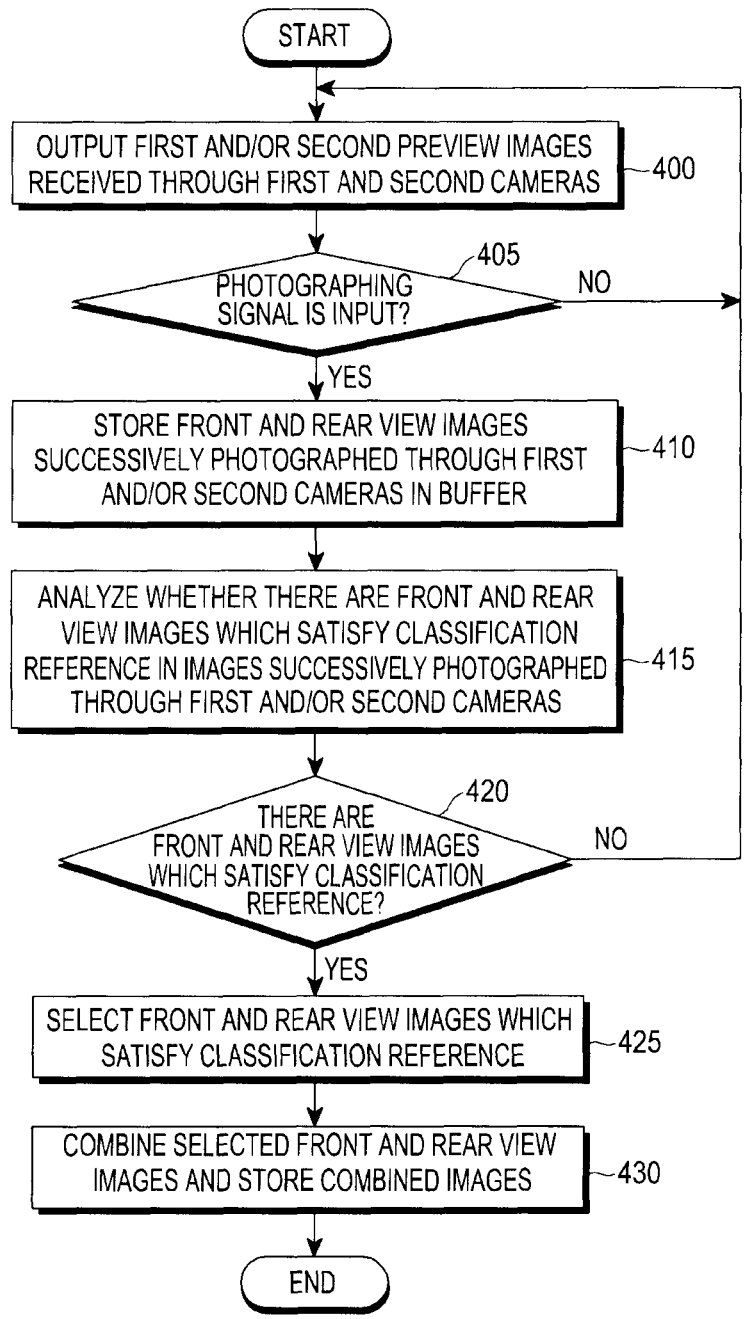
FIG. 4 is an operation flowchart illustrating an image combining process according to a first embodiment of the present invention.

FIG. 4 is an operation flowchart for an image combination method according to a first embodiment of the present invention. The following description of FIG. 4 will be made with reference to FIGS. 5, 6A and 6B to facilitate an understanding of the method.

When a camera application is executed, the controller 110 outputs first and second preview images received in real time through the front and rear cameras, respectively to the touch screen 190 in step 400. Accordingly, the user can preview a front view image received through the front camera, for example, an image of the user and preview a rear view image received through the rear camera, for example, an image of the external subject. As described above, the user can determine when to perform a photographing action through the screen outputting the preview images. Here, the screen outputting the preview images can be configured in a PIP form, or the preview images received through the first and second cameras, for example, front and rear view preview images can be displayed in a position and a size designated by the user. In a state where the preview images are output, when a photographing signal is input in step 405, the controller 110 stores a predetermined number of front and rear view images each successively photographed through the first and second cameras in a buffer in step 410. Herein, "photographing signal" refers to a command signal generated by the portable terminal 100 responsive to a user input command for the capture of an image by the respective camera, or by both cameras. In one implementation, a single shutter icon or physical shutter key (if provided) is displayed to enable capture of both front and rear images simultaneously. In another implementation, two shutter icons, one for each camera, are displayed concurrently.

Figure 5:
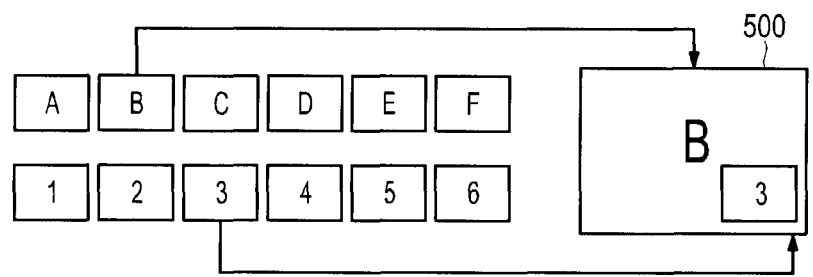
FIG. 5 illustrates an example for describing an image combining method of FIG. 4.

FIG. 5 illustrates images A, B, C, D, E, and F successively photographed at a predefined time interval through the second camera and images 1, 2, 3, 4, 5, and 6 successively photographed through the first camera. In an embodiment, the predetermined number of successively photographed front and rear view images are sequentially stored in the buffer before and after the photographing signal is input as illustrated in FIG. 5. It is noted, to capture the images just before the photographing signal is input, the portable terminal continually captures and displays preview images, and temporarily stores a minimum number of the most recent preview images in a buffer. In this manner, as soon as the user commands the photographing signal, the most recent stored preview images are used for the first portion of the successive images, e.g., for the A, B and C or 1, 2 and 3 images in FIG. 5.

Subsequently, the controller 110 analyzes whether there are front and rear view images which satisfy a predetermined classification reference in the front and rear view images successively photographed through the first and second cameras in step 415. Here, the predetermined reference includes at least one of a blur amount within the image, a specific pattern of a person, and a shooting composition, and corresponds to a numerical value thereof. Further, the same classification reference may be applied to each of the front and rear view images, but it is apparent that different classification references may be applied to the front and rear view images according to characteristics of the front and rear view images. For example, the front view image may be analyzed based on the specific pattern of the person since the front view image is a close-up image generated by photographing the user, and the rear view image may be analyzed based on the blur amount since the rear view image is an image generated by photographing a typical external subject located a significant distance away, such as a scenic image.

Now, the blur amount of the predetermined classification reference according to an embodiment of the present invention can be a numerical value representing image contrast. That is, the blur amount can be established as a numerical value of a hand trembling degree of the user, a motion degree of the subject within an angle of view, and/or a degree by which the camera is out of focus (e.g., due to improper focus). The numerical value may be set based on pre-learned or predetermined set information. Accordingly, the controller 110 determines the blur amount of each of the front and rear view images when the images are analyzed. Suitable algorithms to determine blurring based on image and motion analysis are known by those of skill in the art, thus description thereof is omitted. Further, the specific pattern of the person of the predetermined classification reference can be at least one of a particular facial expression (laughing, frightened and the like), whether eyes are closed, whether the person looks straight ahead, and whether a red eye effect is generated, and can be expressed by a numerical value thereof. Specifically, for laughing criteria, in a portrait image generated by photographing the external subject or the user, a laughing degree is compared with a learning model input in advance for each level of laughing, and a laughing level of the learning model having the highest similarity with the laughing degree is determined. In conjunction with the laughing parameter, whether the eyes are closed, the red eye effect is generated, and the face looks forward are determined as weights and thus a facial expression score becomes a numerical value including the determined laughing level and the weights.

In addition, the shooting composition of the predetermined classification reference can be established as a numerical value of a matching degree between locations of the user's face and the subject by comparing the locations in shooting compositions divided into halves and thirds. The appropriateness of the shooting composition determines whether the shooting composition is the best shooting composition to simultaneously photograph the user and the external subject, that is, whether the shooting composition determined through the image analysis is the best shooting composition. Here, the shooting composition is acquired by using saliency information through which a feature point within the image and factors such as a position and a size of the face can be detected.

By applying the numerical values for the classification reference to the analyzed images, the controller 110 determines whether there are front and rear view images which satisfy the classification reference criteria in the successively photographed front and rear view images in step 420.

For example, when the blur amount of the predetermined classification reference is used, the controller 110 determines whether the blur amount of each of the successively photographed front and rear view images is equal to or lower than a threshold. If so, the corresponding image is determined as the image which satisfies the classification reference. Since there are a plurality of successively photographed images taken by each camera, a plurality of images which satisfy the classification reference may exist. In this case, an image including the smallest blur amount is selected as a best image from the images having the blur amount equal to or lower than the threshold.

Further, when the specific pattern of the person of the predetermined classification reference is applied, a value indicating a specific pattern of the person for each of the successively photographed front and/or rear view images is calculated. By applying the classification reference corresponding to the specific pattern of the person, a priority of each of the front and rear view images can be set. When the specific pattern of the person is applied, a best front or rear view image can be selected through comparison with the threshold.

Further, when the shooting composition of the predetermined classification reference is applied, a numerical value of the matching degree between the position of the user's face and the position of the external subject within the successively photographed front and rear view images generated by comparing the positions in shooting compositions divided into halves and thirds is compared with the threshold. By applying the classification reference corresponding to the shooting composition, a priority of each of the front and rear view images can be set. When the shooting composition is applied, a best front or rear view image can be selected through comparison with the threshold. For example, in a succession of front camera images of the user's face, an image that is the most centered might be selected as the best front image with respect to the shooting composition parameter. Similarly, in a rear image that includes a person, an image containing a subject's entire head would be selected over ones with heads "cut off" in the image. Predetermined composition criteria can be used for scenic type images as well. For instance, in a photograph of a building, an image capturing the entire top or bottom portion of a building might be automatically selected over one in which the top or bottom portion is cut off.

Alternatively, instead of applying only a single parameter for the classification reference, two or more of the blur amount, the specific pattern of the person, and the shooting composition parameters may be applied to the successively photographed front and/or rear view images. In this case, one front view image and one rear view image having the most similar value with a reference value can be selected. In other words, if no single image meets the criteria of all the different parameters, an image that comes closest to satisfying all the criteria may be selected.

When there is one front view image and one rear view image which satisfy the classification reference, the controller 110 selects these images in step 425, combines the two selected images and then stores the combined image in the storage unit 175 in step 430. For example, in FIG. 5, when the rear view image which satisfies a first classification reference is the image B among the images A, B, C, D, E, and F successively photographed through the second camera and the front image which satisfies a second classification reference is the image 3 among the images 1, 2, 3, 4, 5, and 6 successively photographed through the first camera, one combined image 500 is generated by combining the images B and 3.

When there is no front and rear view image which satisfies the classification reference in step 420, for example, when it is determined that there is no front view image and/or rear view image which satisfy at least a minimum individual parameter or combined parameter threshold of the classification reference among the front view images and the rear view images, the process returns to step 400.

Figure 6A:
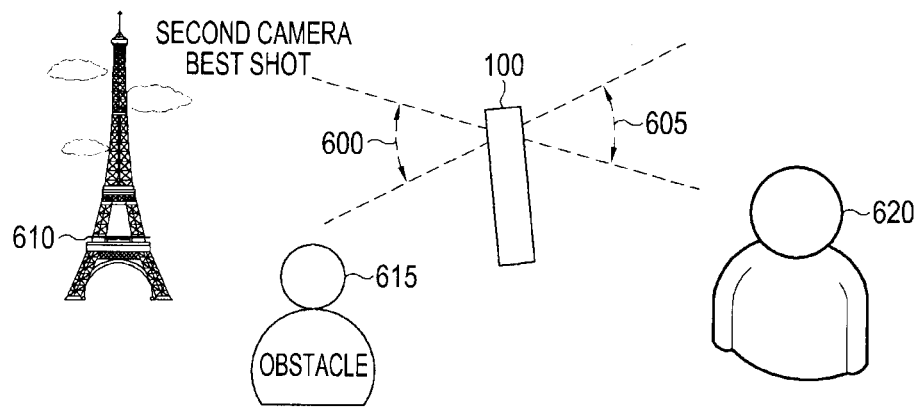
FIGS. 6A and 6B illustrate an example for describing another image combining method of FIG. 4.

For example, in order to acquire the best front and rear view images in the dual shot mode, the desired external subject view, the portable terminal 100 and the user should be located on a straight line. However, for example, as shown in FIG. 6A, when the external subject 610, the portable terminal 100, and the user 620 cannot be located on the straight line because of an obstacle 615, that is, when there is an obstacle at a lower side between the external subject and the portable terminal 100, the user raises the portable terminal 100 to avoid the obstacle and then photographs the external subject 610. Similarly, the portable terminal 100 should be controlled in a low position in close-up photography, for example, during a close-up photo of a friend using the rear camera for the purpose of creating a combined image of the user and her friend. In this case, the external subject, the portable terminal 100, and the user have a difficulty in being located on the straight line.

Further, when the photographing is performed in outdoor bright light, a screen may not be viewed well. For example, when visibility is low due to a backlight or a light reflection, better visibility can be obtained by changing an angle of a display of the portable terminal 100. However, such a motion is impossible in an ideal traditional dual shot, since the front image no longer ideally captures an image of the user's face due to tilt of the portable terminal to implement the angle change. Due to the tilt, the photographing may only be possible without the user watching the preview. In this case, a user's facial expression may be unnatural or a composition such as a position of the face within an angle of view may be different from an intention. Since the external subject and the user's face are not normally included in the front and rear view images photographed in such a state, it is determined that the shooting composition is improper. Accordingly, the controller 110 determines that there is no front or rear view image which satisfies the classification reference.

In this case, the external subject 610 is located with a photographing angle of view 600 of the rear camera as illustrated in FIG. 6A, so that a best shot of the external subject 610 can be acquired based on a visibility or other criteria (visibility may be considered an aspect of the blurring criteria described above). Accordingly, the rear view image which satisfies the classification reference can be acquired, but the front view image cannot satisfy the classification reference. Therefore, the controller 110 displays a front preview image received through the front camera by returning to step 400 to drive again only the front camera and then analyzes front view images successively photographed through the front camera when a photographing signal is input in step 405. During this process, controller 110 may display prompts instructing the user, or output audio prompts, to advise the user to restore a position of the camera for capturing a best front view shot and completing a satisfactory PIP combined image using the already captured best rear view shot.

Figure 6B:
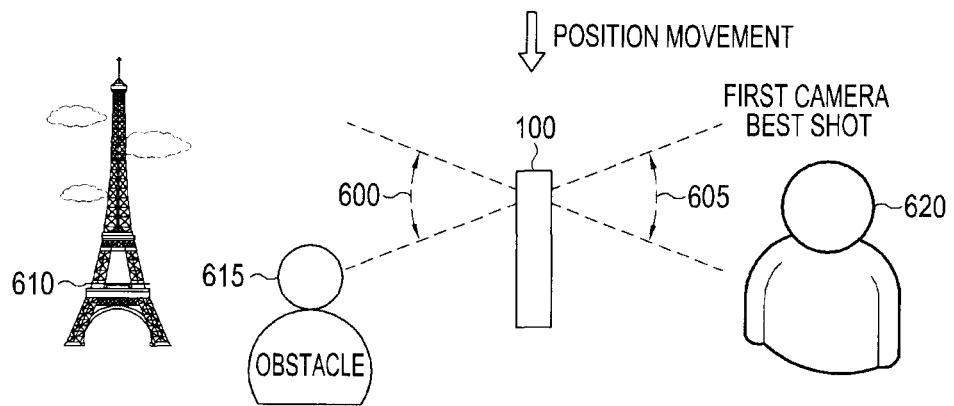

For example, when the best shot of the external subject 610 is acquired through the second camera as illustrated in FIG. 6A and then the photographing is performed after moving the portable terminal 100 as illustrated in FIG. 6B, a best shot of the user 620 located within a photographing range 605 can be acquired even though there is the obstacle 615 within the photographing range 600 of the second camera. Alternatively, when the user moves the portable terminal 100 to successively photograph images with various shooting compositions during the photographing, the controller 110 can recommend, through a display prompt or the like, a best shooting composition through the image analysis. As described above, according to the present invention, even though the external subject, the portable terminal 100, and the user are located on the straight line, it is possible to acquire the combined image photographed with the best shooting composition.

As described above, when at least one of the front and rear view images does not satisfy the classification reference in step 420, the controller 110 controls an operation for re-photographing. Accordingly, the process returns to step 400. Further, when both the front and rear view images do not satisfy the classification reference, the front and rear view images are photographed again by driving both the first and second cameras. When only one of the front and rear view images does not satisfy the classification reference, only one camera for photographing the corresponding image is driven. For example, when there is an image which satisfies the classification reference among the front view images, the front view image which satisfies the classification reference is stored and then re-photographing is performed to acquire a rear view image which satisfies the classification reference. When there is a selected rear view image which satisfies the classification reference among the re-photographed rear view images, the rear view image is combined with the pre-stored front view image and then the combined image is stored.

Figure 7:
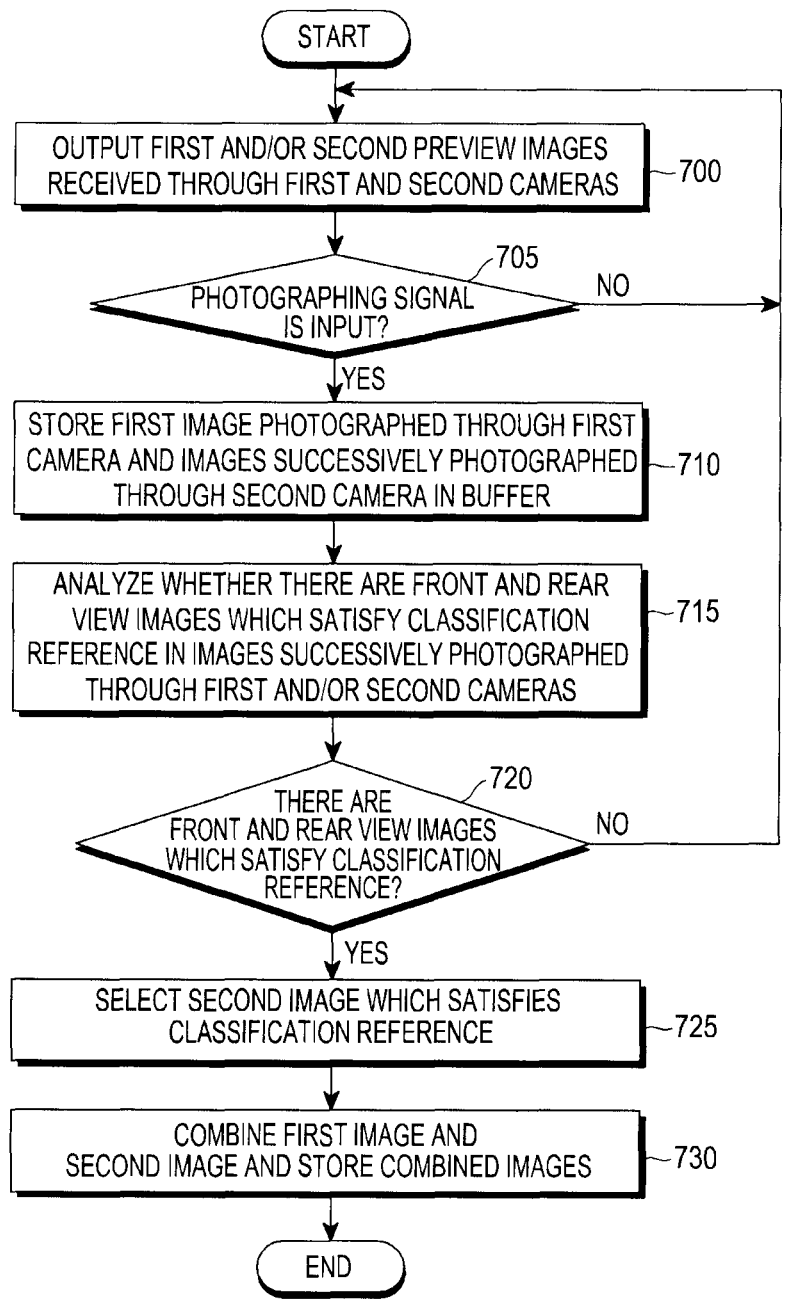
FIG. 7 is an operation flowchart illustrating an image combining process according to a second embodiment of the present invention.

Turning now to FIG. 7, an operation flowchart illustrating an image combining process according to a second embodiment of the present invention is shown. This process performs single image photographing through one of the first and second cameras and successive photographing through the other camera, combining an image corresponding to the best shot among the successively photographed images and the image photographed only once, and storing the combined image.

Steps 700 and 705 are identical to steps 400 and 405 of FIG. 4, thus description thereof is omitted. Once a photographing signal is input at step 705, in step 710 a first image photographed through the first camera is stored in a buffer, without capturing and analyzing a plurality of successive first images, while successive images are photographed through the second camera and stored in the buffer. Next, in step 715, it is analyzed whether there is an image which satisfies the classification reference in the successively photographed images. (Note that the roles of the first and second cameras can be reversed via suitable selection in a settings menu or by preset design, such that single image photographing is performed through the second camera and successive photographing is performed through the first camera in an identical process to that just described.) Subsequently, it is determined whether there is an image which satisfies the classification reference in the successively photographed images in step 720, a second image which satisfies the classification reference is selected in step 725, and the first image and the second image are combined and the combined images are stored in step 730.

Figure 8:
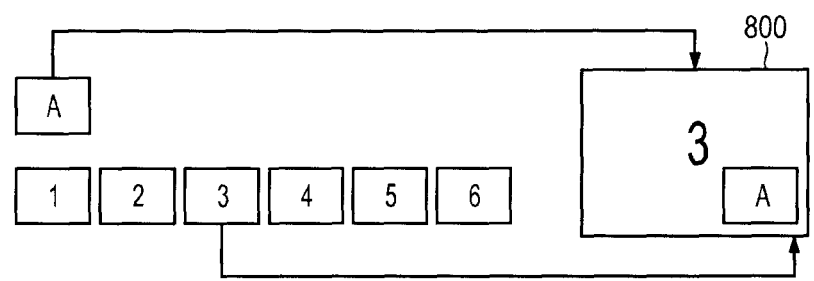
FIG. 8 illustrates an example for describing an image combining method of FIG. 7.

FIG. 8 illustrates an image A photographed in a single image capture operation through the first camera and images 1, 2, 3, 4, 5, and 6 photographed through the second camera. The single image and the predetermined number of successively photographed images are sequentially stored in the buffer before and after the photographing signal is input as illustrated in FIG. 8. In the example shown, when an image which satisfies the classification reference is the image 3 among the images 1, 2, 3, 4, 5, and 6 successively photographed through the second camera, one combined image 800 is generated by combining the image A photographed through the first camera and the image 3.

Figure 9:
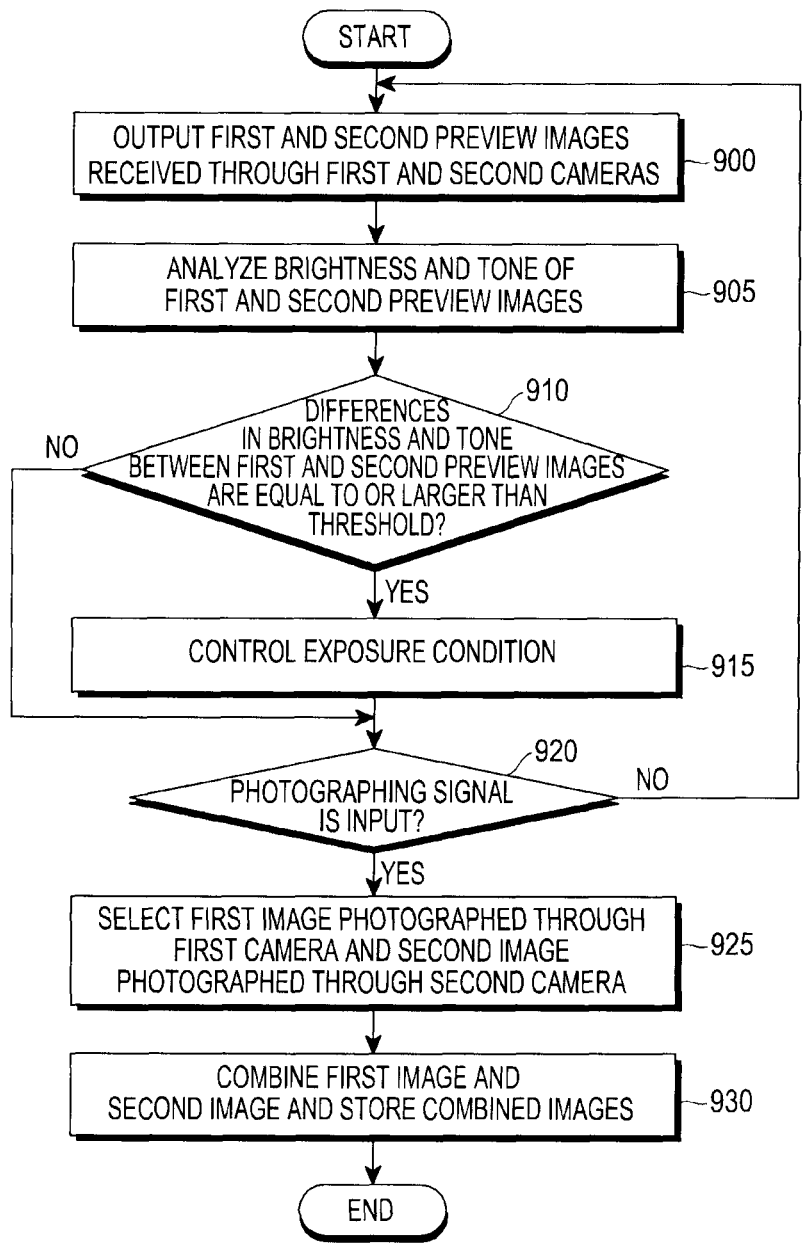
FIG. 9 is an operation flowchart illustrating an image combining process according to a third embodiment of the present invention.

FIG. 9 is an operation flowchart illustrating an image combining process according to a third embodiment of the present invention, and illustrates a process of controlling conditions for image processing before photographing front and rear view images to minimize an effect by a photographing environment and then selecting images to be combined.

In a state where first and second preview images received through the first and second cameras, respectively, are output in step 900, the controller 110 at step 905 analyzes brightness and tone of the first and second preview images. The analysis is for determining a state of the photographing environment. Subsequently, it is determined whether differences between brightness and/or tone of the first preview image as compared to second preview image are equal to or larger than a threshold (or respective thresholds for brightness and tone) in step 910. Here, the brightness comparison corresponds to an operation of comparing brightness when a sensor gain and an exposure time of at least one of the first and second cameras are restricted as a value equal to or lower than a predetermined level. Further, the tone comparison corresponds to an operation of comparing at least one of a dynamic range within the image or a histogram shape.

In the case where the difference is equal to or larger than the threshold, when the first and second preview images are combined, the differences may be very obvious, so that the controller 110 performs an operation of controlling an exposure condition to make brightness and tone between the first and second preview images similar in step 915. When the difference is lower than the threshold, brightness and tone between the first and second preview images are similar, so that a natural combined image can be acquired when the images are combined.

In an embodiment, a method of controlling the exposure condition includes exposure correction modes such as a High Dynamic Range (HDR) and a Low Light Shot (LLS). For example, when a gradation difference of the front view image is larger than a gradation difference of the rear view image, the exposure condition of the HDR is set as (+1,0,−1) for the front view image such that a difference in steps according to an exposure chart is small, and set as (+2,0,−2) for the rear view image such that a difference in steps according to an exposure chart is large. Further, when brightness of the front view image is brighter than the rear view image, a sensor gain for the front view image may be set low, for example, ISO 100, and a sensor gain for the rear view image may be set relatively high, for example, ISO 200 in the LLS exposure.

As described above, in order to reduce the differences in brightness and tone between the front view image and the rear view image due to the effect of the surrounding photographing environment, the process of controlling the exposure condition to make similar brightness and tone is performed before taking an actual picture after comparing differences in brightness and tone between the front view image and the rear view image received before the photographing. Then, when the photographing signal is input in step 920, the controller 110 selects the first image photographed through the first camera and the second image photographed through the second camera in step 925, and then combines the first and second images and stores the combined images in step 930.

Figure 10:
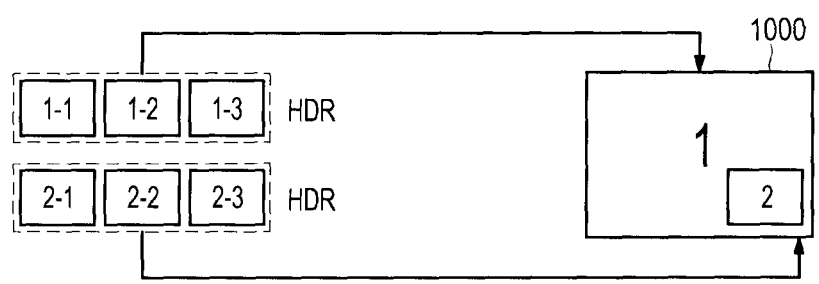
FIG. 10 illustrates an example for describing an image combining method of FIG. 9.

FIG. 10 illustrates an example of combining images in accordance with the method of FIG. 9. Images 1-1, 1-2, and 1-3 photographed through the first camera according to the HDR exposure correction mode and stored in the buffer become one HDR image 1 and images 2-1, 2-2, and 2-3 photographed through the second camera and stored in the buffer become another HDR image 2. Then, one combined image 1000 is generated by combining the HDR image 1 and the HDR image 2 corresponding to the front and rear view images. Further, in the LLS exposure correction mode, an LLS front view image and an LLS rear view image become one combined image. Note that while FIG. 10 illustrates the case of applying the HDR exposure correction mode to both the front and rear view images, the HDR exposure correction mode can be applied to only one image, while still achieving some improvement in harmonizing the front and rear images.

When respective effective images are selected from the images photographed under the exposure condition controlled in the above way, the best combined image can be acquired. For example, when a subject photographed through the first camera is a person, the best combined image can be acquired by segmenting the person and combining the segmented image and the image photographed through the second camera. Although the exposure correction has been described as an example, operations such as color correction, white balance and the like may be performed alternatively or additionally.

Figure 11:
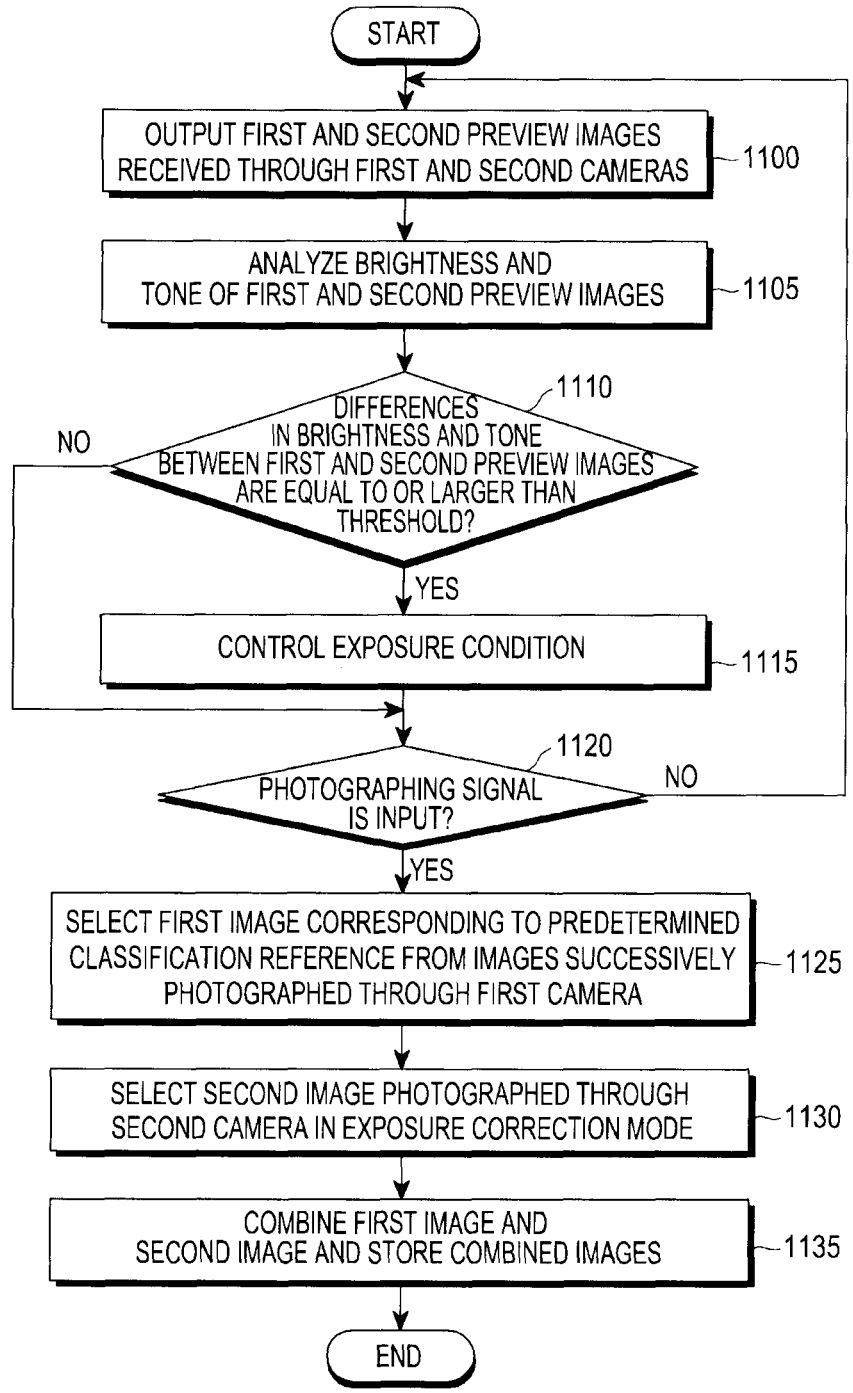
FIG. 11 is an operation flowchart illustrating an image combining process according to a fourth embodiment of the present invention.

FIG. 11 is an operation flowchart illustrating an image combining process according to a fourth embodiment of the present invention. This process generates a combined image by selecting effective images from images photographed through the respective cameras when one of the first and second cameras 151 and 152 is operated in the best shot mode and the other camera is operated in the exposure correction mode.

Referring to FIG. 11, detailed descriptions of steps 1100 to 1120 is omitted since the steps are identical to operations of steps 900 to 920 of FIG. 9. However, in FIG. 11, when the photographing signal is input, the first image (which can be either a front or rear image) corresponding to a predetermined classification reference is selected from images successively photographed through the first camera in step 1125. Further, the second image (which can be either a rear or front image) photographed through the second camera in the exposure correction mode is selected in step 1130. Subsequently, the first image and the second image are combined and then the combined images are stored in step 1135.

Figure 12:
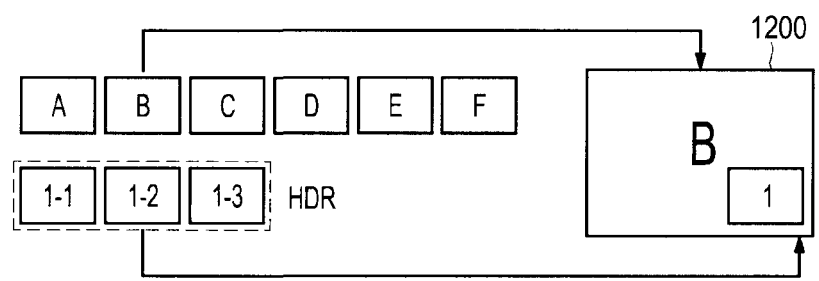
FIG. 12 illustrates an example for describing an image combining method of FIG. 11.

FIG. 12 illustrates images A, B, C, D, E, and F successively photographed through the first camera operating in the best shot mode and stored in the buffer and images 1-1, 1-2, and 1-3 photographed through the second camera operating in the exposure correction mode and stored in the buffer. When the images 1-1, 1-2, and 1-3 stored in the buffer become the one HDR image 1 and an image which satisfies the classification reference is the image B among the images A, B, C, D, E, and F through the image analysis according to the best shot mode, the image B corresponding to the best shot through the first camera and the exposure-corrected HDR image 1 are combined and then one combined image 1200 is generated.

Although exemplary embodiments of the present invention have been described, the present invention is not limited the above described specific embodiments. For example, there is a method of combining images into one image by considering a matching degree between the front and rear view images. An example of the method of considering the matching degree includes a method of selecting an image to be combined based on similarity between facial expressions of the photographer and the person corresponding to the external subject which includes a process of comparing a laughing level of the person corresponding to the subject with an image for each pre-modeled laughing level, classifies the laughing level of the subject as a level having a highest similarity, and selecting, when a laughing level of the photographer is most similar to the laughing level of the subject, the corresponding images as images to be combined.

Another example considering the matching degree includes a method of recognizing the photographer and the subject corresponding to the person through a face recognition and applying different placements according to a relation therebetween when they are combined. There is a method of disposing an image of the photographer close to a subject having a closest relation with the photographer when there are a plurality of subjects. Here, the relation can be designated as a collective numerical value of the number of times of phone calls, call duration, the number of times of message transmission, and the number of times of SNS confirmation. Other examples of the method considering the matching degree includes a method of comparing face sizes of the photographer and the subject corresponding to the person, resizing the face sizes to be similar through e.g., the use of different zoom settings, and then placing the images of the photographer and subject having the resized face in a predetermined relationship in the composite image. Yet another method corrects for a condition of an atmosphere difference between the photographer and the subject due to a lighting condition or a screen background color, by unifying atmospheres of front/rear images through changing a color tone and setting an exposure condition suitable for the corresponding tone.

When the user desires to change a combination of best images recommended to the user by the method (through display prompts, etc.) considering the matching degree, the combination may be changed in the following way. For example, when the user desires to change the combination of front/rear view images manually, there is a method of sequentially disposing candidate images according to the matching degree and setting a type of combination differently based on the user's selection. Alternatively, there is a method of performing a switching to the next candidate image when selecting the front/rear view image from the combined image without displaying candidate images in the manual combination. In another alternative method, when the front view image is changed, the rear view image is automatically changed to one having the highest matching degree.

In the above examples, the first camera has been generally described in the context of the front camera, and the second camera has been generally described in the context of the rear camera; however, this relationship may be interchanged as desired in other applications. For instance, the user may desire that the front image is the larger image and the rear image is the reduced image in a PIP combination. In some embodiments, the PIP front and rear image relationship, i.e., which image is the larger image and which is the smaller image, is settable in a settings menu or the like.

Further, although the touch screen has been described as a representative example of the display unit for displaying the screen, general display units such as a Liquid Crystal Display (LCD), an Organic Light Emitting Diode (OLED), an LED and the like which do not have a touch detection function may be used instead of the touch screen.

According to embodiments of the present invention, when different images are combined by using a plurality of cameras, there is an effect of improving quality of a combined image by combining images which satisfy a predetermined reference, and there is an advantage of increasing convenience in using a combination function through the predetermined reference.

Further, embodiments have an advantage in that the user can use an image combining function even when it is difficult to simultaneously secure two or more shooting compositions by photographing an image through one of the front and rear cameras and then photographing a different direction image through the other camera.

In addition, embodiments have an effect of reducing an obviousness of difference of the combined image by performing the photographing after controlling brightness and tone of images to be combined. Furthermore, the present invention improves convenience in re-photographing an image by, when a quality of only one of the images photographed in a dual shot mode is equal to or lower than a reference value, storing the other image and then combining the other image with the re-photographed image.

It may be appreciated that embodiments of the present invention can be implemented in software, hardware, or a combination thereof. Any such software may be stored, for example, in a volatile or non-volatile storage device such as a ROM, a memory such as a RAM, a memory chip, a memory device, or a memory IC, or a recordable optical or magnetic medium such as a CD, a DVD, a magnetic disk, or a magnetic tape, regardless of its ability to be erased or its ability to be re-recorded. It can be also appreciated that the memory included in the mobile terminal is one example of machine-readable devices suitable for storing a program including instructions that are executed by a processor device to thereby implement embodiments of the present invention. Therefore, embodiments of the present invention provide a program including codes for implementing a system or method claimed in any claim of the accompanying claims and a machine-readable device for storing such a program. Further, this program may be electronically conveyed through any medium such as a communication signal transferred via a wired or wireless connection, and embodiments of the present invention appropriately include equivalents thereto. Any of the functions and steps provided in the Figures may be implemented in hardware, software or a combination of both and may be performed in whole or in part within the programmed instructions of a computer. No claim element herein is to be construed under the provisions of 35 U.S.C. 112, sixth paragraph, unless the element is expressly recited using the phrase "means for".

Further, the portable terminal can receive the program from a program providing apparatus connected to the portable terminal wirelessly or through a wire and store the received program. The program providing apparatus may include a memory for storing a program containing instructions for allowing the portable terminal to perform a preset content protecting method and information required for the content protecting method, a communication unit for performing wired or wireless communication with the portable terminal, and a controller for transmitting the corresponding program to the portable terminal according to a request of the portable terminal or automatically.

While the present invention has been shown and described with reference to certain embodiments thereof, it will be understood by those skilled in the art that various changes in form and details may be made therein without departing from the spirit and scope of the present invention as defined by the appended claims.

What is claimed is:

1. A method of combining effective images in an electronic device having a plurality of cameras, the method comprising:
   in response to a photographing signal, temporarily storing images successively photographed through a first camera;
   selecting a first image which satisfies a predetermined classification reference from the images successively photographed through the first camera; and
   combining a second image photographed through a second camera with the first image,
   wherein the predetermined classification reference is a numerical value of a shooting composition,
   wherein the shooting composition is a numerical value of a matching degree between a position of a user's face and a position of a subject in a shooting composition divided into halves or thirds by comparing the positions.

2. The method of claim 1, wherein the predetermined classification reference is a first classification reference, and the method further comprising:
   temporarily storing images successively photographed through the second camera in response to the photographing signal; and
   selecting the second image as an image that satisfies a second predetermined classification reference from the successively photographed images,
   wherein the selected second image and the first image are combined.

3. The method of claim 2, further comprising:
re-photographing images through at least one of the first camera and the second camera when there is no image that satisfies the first or second classification reference in the images successively photographed through the first and second cameras; and
determining whether there is an image which satisfies the classification reference in the images successively re-photographed through the first camera or the second camera.

4. The method of claim 1, further comprising:
previewing the images received through the first camera and the second camera;
analyzing a difference in at least one of brightness and tone between the previewed images; and
controlling an exposure condition when the difference between the previewed images is equal to or larger than a threshold.

5. The method of claim 4, wherein the images photographed through the first camera and the second camera which operate in accordance with the controlled exposure condition are combined.

6. An electronic device having a plurality of cameras for combining effective images, the electronic device comprising:
a first camera which successively photographs images in response to a photographing signal;
a second camera which photographs a second image; and
a controller which selects a first image satisfying a predetermined classification reference from the images successively photographed through the first camera and combines the first and second images;
wherein the predetermined classification reference is a numerical value of shooting composition,
wherein the shooting composition is a numerical value of a matching degree between a position of a user's face and a position of a subject in a shooting composition divided into halves or thirds by comparing the positions.

7. The electronic device of claim 6, wherein the predetermined classification reference is a first classification reference, and the controller temporarily stores images successively photographed through the second camera in response to the photographing signal, selects the second image which satisfies a second predetermined classification reference from the successively photographed images, combines the selected second image and the first image, and then stores the combined image in a storage unit.

8. The electronic device of claim 7, wherein the controller re-photographs images through at least one of the first camera and the second camera when there is no image which satisfies the classification reference in the images successively photographed through the first and second cameras, and determines whether there is the image which satisfies the classification reference in the images successively re-photographed through the first or second cameras.

9. The electronic device of claim 6, further comprising a display unit which previews the images received through the first camera and the second camera.

* * * * *